(12) United States Patent
Gontmakher et al.

(10) Patent No.: US 6,478,993 B2
(45) Date of Patent: Nov. 12, 2002

(54) METHOD FOR THE MANUFACTURE OF FOAMED MATERIALS

(76) Inventors: Vladimir Gontmakher, Kelkheimer Strasse 11, 65779 Kelkheim-Fischbach (DE); Evgueni Pevzner, Kelkheimer Strasse 11, 65779 Kelkheim-Fischbach (DE)

(*) Notice: Subject to any disclaimer, the term of this patent is extended or adjusted under 35 U.S.C. 154(b) by 0 days.

(21) Appl. No.: 09/862,021

(22) Filed: May 21, 2001

(65) Prior Publication Data

US 2002/0038919 A1 Apr. 4, 2002

Related U.S. Application Data

(63) Continuation-in-part of application No. 09/641,290, filed on Aug. 18, 2000, now Pat. No. 6,368,527
(60) Provisional application No. 60/287,482, filed on Apr. 30, 2001.

(51) Int. Cl.[7] .......................... B29C 65/00; C03B 19/00
(52) U.S. Cl. .......................... 264/42; 264/43; 65/17.3; 65/17.5
(58) Field of Search ...................... 264/42, 43; 65/17.5, 65/17.3

(56) References Cited

U.S. PATENT DOCUMENTS 3,425,577 A * 2/1969 Copley et al.
4,261,938 A * 4/1981 Engstrom et al. ............. 264/43
5,516,351 A * 5/1996 Solomon et al. ............. 65/17.4

FOREIGN PATENT DOCUMENTS

DE          384379 A1 * 8/1990

* cited by examiner

*Primary Examiner*—Christopher A. Fiorilla
(74) *Attorney, Agent, or Firm*—Reising, Ethington, Barnes, Kisselle, Learman & McCulloch, P.C.

(57) ABSTRACT

A method of forming foamed articles suitable for refractory, thermal insulation and construction application in a form such as bricks, blocks, slabs and discs includes the preparation of homogeneous mixture of at least one oxygen-containing, water-insoluble raw material having a particle size <200 microns and at least one gas forming reagent having a particle size <130 microns. The mixture is humidified and shaped and then heated to a formation temperature sufficient to melt the raw material to develop an oxygen-containing molten liquid phase. This phase reacts at the formation temperature with the gas-forming reagent to induce a foamed structure which is then cooled to a solid state. The raw materials preferably make up 99–99.95 wt % of the mixture, and the gas forming reagent makes up the balance. This weight and particle size ratio of the components yields evenly distributed, isolated, spherical pores which imparts uniform strength and integrity to the resultant material while greatly reducing its weight and thermal conductivity.

2 Claims, No Drawings

METHOD FOR THE MANUFACTURE OF FOAMED MATERIALS

The disclosure is a continuation-in-part of the manufacture of foamed materials disclosed in U.S. patent application serial No. 09/641,290, filed Aug. 18, 2000 now U.S. Pat. No. 6,368,527 and provisional patent application serial No. 60/287,482, filed Apr. 30, 2001, the priority of each of which is claimed for this application.

BACKGROUND OF THE INVENTION

1. Technical Field

The invention relates to processes for the manufacture of foamed articles for refractory, thermal insulation and construction applications such as in the form of bricks, blocks, slabs or discs.

2. Related Art

A problem of a decrease of the density and thermal conductivity is extremely important for producing refractory, thermal isolation and construction articles. This problem is solved by developing new porous materials. An effective method for forming porous structures is the method for the manufacture of foamed materials. There are two main routes presently known for the production of a foamed structure.

I Route:
  (a) preparing a stable foam from water and foaming agent;
  (b) preparing a wet mixture of solid components, where cement is the main substance;
  (c) quick mixing (a) with (b); and
  (d) filling the molds with prepared in (c) foam mass.

U.S. Pat. No. 4,158,685 describes the method of making an insulating refractory shape by: (a) preparing a slip of water, deflocculating agent, finely divided solid refractory particles, and binder; (b) preparing a foam of water, air, and foaming agent; (c) admixing the slip and the foam to produce a foamed slurry; (d) casting the slurry into molds; (e) curing; (f) drying the cast pieces so formed; and (g) firing the pieces, the improvement wherein: (1) the slip consists essentially of at least 7.5% cement, from 0 to 50% clay, the balance of the solid ingredients being refractory aggregate all of which passes a 28 mesh screen, all percentages being by weight and based on the total weight of dry solid ingredients, and sufficient water to produce, when mixed with the foam, a foamed slurry having a viscosity of from 1000 to 30,000 centipoises; (2) the foam has a density of not over about 5 pcf, (3) the slip and the foam are admixed in the proportion of from 0.25 volume to 3 volumes of foam for each volume of slip; (4) the cast foamed slurry is cured at a temperature of not over about 72° F. for 16 to 24 hours and then (5) dried at a temperature of not over about 200° F.

U.S. Pat. No. 3,944,425 describes foamed lightweight ceramic compositions. A fired clay product composed of a rigid cellular mass having a bulk density in the range from about 10 to about 105 pcf obtained by mixing, foaming and firing a composition comprising about 20 to about 95 parts of clay, about 4 to about 35 parts of hydraulic cement, about 0.2 to about 30 parts of inert particulate lamellar foam stabilizer, from 0 up to about 76 parts of inert solid material, about 21 to about 70 parts of water, and a gas generating agent, said parts being by weight of the dry ingredients, all of the foaming action having occurred between cessation of said mixing and about 10 minutes thereafter.

II Route:

A foamed structure is a result of dissociation and/or burning reactions, which go with gassing in heated to the molten state mixture.

U.S. Pat. No. 5,516,351 describes a foamed glass product that can be used as insulation products. The process comprises providing crushed glass particles and a foaming agent, preferably related from $CaCO_3$ or $CaSO_4$. The pretreated glass and foaming agent are sized and mixed. The mixed glass and foaming agent are placed in molds and passed through a furnace where the mixture is heated to a foaming temperature and then cooled to produce foamed glass blocks. Furthermore a non-reactive gas selected from $SO_3$ and $CO_2$ is provided to sweep air away from the mixture during heating. The size of the starting glass particles impacts the insulation properties. A starting glass particle size of approximately 100–700 microns is preferred.

U.S. Pat. No. 3,975,174 relates to a method for manufacture of foamed glass. Finely divided glass, which may have a viscosity between $10^6$ and $10^7$ poises at 950° C. to 1100° C. and which may be of a composition suitable to conversion into a vitroceramic, is mixed with up to a few percent by weight of a foaming agent including a mixture of $SnO_2$ and SiC, in equimolar or with an excess of SiC. The resulting mixture is heated to 950° C. to 1100° C. to effect foaming by evolution of $CO_2$ from the foaming agent, and the resulting glass foam is cooled. The nucleation and crystallization steps by which the glass is converted to a vitroceramic may be caused to occur without allowing the foam to return to room temperature.

U.S. Pat. No. 4,992,321 describes a similar method for manufacture of foam glass.

However these methods have some disadvantages.

In I Route—Foamed structure is damaged by mixing solid components with the foam. The time of homogenization is limited and does not allow for the production of a regular, controlled structure of the material.

In II Route—There is an indispensable requirement that the melting and dissociation processes have to coincide at the same temperature interval. This limits chemical composition of the mixtures.

SUMMARY OF THE INVENTION AND ADVANTAGES

A method according to the invention of forming foamed articles comprises preparing a homogeneous mixture of at least one oxygen-containing, water-insoluble raw material having a particle size <200 microns and at least one gas forming reagent having a particle size <130 microns. The mixture is humidified, shaped and heated to a formation temperature sufficient to melt the raw material to a molten liquid state at which point the raw material reacts with the gas forming reagent to produce a molten liquid foamed material. Once foamed, the material is cooled to a solid state.

The subject method has the advantage of enabling the production of foamed structural articles from different raw materials or combinations of materials for refractory, thermal isolation, construction and other application. The basis of the subject foaming method is a chemical gassing reaction. According to further preferred features of the invention, clusters of carbides and nitrides (boron, silicon, titanium, vanadium, wolfram and etc.) act as universal gas forming reagents. The clusters react with oxygen-containing liquid phase (molten state of the raw materials) at a temperature of its formation. The result of this reaction is gaseous carbon or nitrogen oxides that generate a foamed structure. At heating, the inorganic oxygen-containing natural and synthesized: silicate, aluminasilicate, borate, phosphate in crystalline, vitreous or amorphous state and large number of oxides ($B_2O_3$; $Al_2O_3$; $SiO_2$; $P_2O_5$; $ZrO_2$ and etc.) and/or mixtures of said above raw materials turn into liquid phase (molten state) which, independent of the temperature of its formation, reacts with the gas forming reagent. The speed of the gassing reaction can be advantageously adjusted with great precision by: selection of the particle size of gas forming reagent (carbide, nitride), control of the viscosity of liquid phase (molten state) and duration at the heating temperature.

DETAILED DESCRIPTION

A method of forming foamed structural articles according to a presently preferred embodiment of the invention includes the preparation of a homogeneous mixture of at least one oxygen-containing, water-insoluble raw material having a particle size <200 microns and at least one gas forming reagent having a particle size <130 microns. The components of the mixture can be sized separately and then blended together or else sized and blended at the same time, depending upon the selection of the components. The mixture is humidified by adding water to the mixture. The amount of water can be varied depending upon the material and the property of the humidified mixture which is desired. For example, the mixture can be humidified to a level where the homogeneous mass exhibits the property of thixotrophy, wherein the material becomes more fluid when agitated such that it can properly and fully fill the shape of a mold cavity and thereafter has the characteristic of setting up and taking the shape of the mold when agitation is discontinued, such that the material can be removed from the mold while retaining the shape imparted by the mold cavity. Such a "green" molded article may be heated apart from the mold to form the desired foamed structure.

The humidification of the material may be carried out before, during or after the blending of the materials that make up the homogeneous mixture. In other words, the materials may be dry blended and then moisture added or wet blended and moisture removed, if necessary, to achieve the desired humidity level.

The humidified homogeneous mixture is shaped and thereafter heated to a formation temperature sufficient to melt the raw material to provide an oxygen-containing molten liquid phase. The liquid phase reacts, at the formation temperature, with the gas forming reagent to produce a molten liquid foamed material which is then cooled to a solid state. Further details of this basic process are described in further detail below.

The raw materials may be either ductile, inductile, or a combination of ductile and inductile materials. The inductile materials are ground to a particle size <200 microns, preferably <60 microns. The ductile materials do not require grinding since a particle size of clay minerals is considerably <60 microns. Depending on desired properties of the resulting material, single or multiple component mixtures can be prepared from the above-mentioned materials.

Homogenization of the mixture can be reached either by dry or wet combined grinding of the raw materials with fine ground gas-forming reagent or by mixing of separately fine ground raw materials with fine ground gas reagent. As gas forming reagent particles have a size 1.5–3 times as small as particles of ground raw materials, for example <30 microns if the particles of ground raw materials have a particle size of <60 microns, a ratio of particles of gas forming reagent to particles of raw materials in a range between 1:40 to about 1:200 can be obtained. In that case, every particle of gas forming reagent is surrounded by several layers, for example 3–6 layers, of particles raw materials. The fine ground gas forming reagent (carbide or nitride) in the homogeneous mass of single or multiple component mixture achieves the formation of a regular foamed structure.

Formation of articles can be carried out by any of a number of well-known shaping techniques, depending on the selection of raw materials and method of a preparation of the mixture.

A method of vibroformng can be applied to the mixtures containing mostly inductile raw materials at the humidity of the mixtures displaying the property of thixotropy. The required humidity c an be reached by either moisturizing dry mixtures or by pumping the water from a slurry using filterpresses.

To the mixtures of ductile raw materials a s well as mixtures of ductile with inductile raw materials the following methods can be applied:

filterpressing of a slurry, extrusion of ductile mass prepared by either moisturizing dry mixtures or by pumping the water from a slurry, and pressing of powders prepared by either moisturizing of dry mixtures or drying a slurry in spray dryers.

The resultant material from the subject method is hardened foam with evenly distributed, isolated pores. The regular distribution of pores improves the properties of the foamed material. The foamed material has an outstanding thermal resistance and strength and is gas and water-proof (i.e., the pores are closed). This material also is low density and displays low thermal conductivity.

The control of the viscosity of liquid phase allows the materials to be heated without the support of any molds made from expensive, heat-resistant stills, since the resulting material keeps its shape even if its volume is increased 4–15 times.

To produce foamed materials from inorganic oxygen-containing natural and synthesized: silicate, aluminasilicate, borate, phosphate in crystalline, vitreous or amorphous state and large number of oxides (e.g., $B_2O_3$; $Al_2O_3$; $SiO_2$; $P_2O_5$) with the temperatures of formation of liquid phase <2100° C., SiC (from cluster of carbides or nitrides) may be used because of its relative low cost. For materials having the temperatures of formation of liquid phase higher than 2200° C., for example $ZrO_2$; MgO and others, vanadium or wolfram carbides or nitrides can be used as gas forming reagent.

According to the invention, a method for the manufacture of foamed materials from inorganic oxygen-containing natural and synthesized: silicate, aluminasilicate, borate, phosphate in crystalline, vitreous or amorphous state and large number of oxides, is characterized by the following steps:

a) preparing a homogeneous mixture from fine ground raw materials (99.0–99.95%) and fine ground gas forming reagent (0.05–1%) by weight, b) forming of an article with required dimensions and shape, c) heating the article at the required temperature parameters, and d) cooling and calibration of the resulting material.

Silicates include: Talc ($Mg_3Si_4O_{10}(OH)_2$), Olivin (Mg, Fe)$_2SiO_4$), Forsterite ($Mg_2SiO_4$), Fayalite ($Fe_2SiO_4$), Silicate glass ($M_2$,N) $Si_XO_Y$ where: M=Na, K; N=Ca, Mg, Ba, Fe and others.

Aluminasilicates include: Andalusite ($Al_2SiO_5$), Obsidian, Mullite ($Al_6Si_2O_{13}$), Feldspar (M Al)(Al Si)$_3O_8$ where M=Na, K, Ca, Fe, Perlite (($Na_2O$, $K_2O$), (CaO, MgO, FeO), ($Al_2O_3$, $Fe_2O_3$)n$SiO_2$), Mullitocorund, Aluminasilicate Glass ($Na_2O$, $K_2O$), (CaO, MgO, FeO), ($Al_2O_3$, $Fe_2O_3$)

$nSiO_2$), window glass, bottle glass, other glasses), Kyanite ($Al_2SiO_5$), Cordierite ($Mg_2Al_4Si_5O_{18}$), Nepheline ((Na,K)$AlSiO_4$), Pyrophilite ($AlSi_2O_5(OH)$), Sillimanite ($Al_2SiO_5$), Vermiculite ((Mg, Fe, $Al)_3(AlSi)_4O_{10}(OH)_2 4H_2O$), Clays (montmorillonite, illite, hydro mica, kaolinite), Ball clay, diaspore clay, flint clay, kaolin, and burnt clays (chamotte), expanded perlite and other burnt described materials.

Borates include: Danburite ($CaB_2Si_2O_8$), Borosiliocate glasses, and Datolite ($CaBSiO_4(OH)$).

Phosphates include: Apatite ($Ca_5(PO_4)_3OH$), Aluminaphosphate ($AlPO_4$), Aluminaphosphosilicate glass, and Aluminachromphosphate.

Oxides include: Quartz ($SiO_2$), Silica ($SiO_2$), Quartz glass ($SiO_2$), $Al_2O_3$, Corundum ($Al_2O_3$), $B_2O_3$, MgO, Chrome ore (($Fe,Mg)(Cr,Al)_2O_4$), Dolomite/Limestone ($CaMg(CO_3)_2$), Magnetite (($Fe,Mg)Fe_2O_4$), Rutile ($TiO_2$), $TiO_2$, Spinel ($MgAl_2O_4$), Baddeleyte ($ZrO_2$), $ZrO_2$; and others.

Foamed materials can be produced from ductile and inductile materials and their mixtures as mentioned. The plastic or ductile materials include unburnt: clays (montmorillonite, montmorillonite—hydro mica, hydro mica, kaolinite—hydro mica, kaolinite) and kaolin.

The inductile materials are burnt: clays, kaolin and natural volcanic glass (perlite both raw and expanded); oxygen-containing natural and synthesized crystalline, vitreous, amorphous materials, as well as glass-forming boron, aluminum, silicon, phosphorus and other oxides.

Depending on chosen raw materials, the composition of the mixture and the method of its shaping, obtained articles are dried at the different temperature parameters either in special dryers designed for the particular article or materials involved, if need be, or in a furnace directly to remove moisture.

After drying, the articles are heated to the liquid formation temperature. The heating parameters are determined by both composition of the mixture and properties of a resulting material desired.

EXAMPLES

Example 1

| | |
|---|---|
| *Synthesized glass - bottle-glass | 90.0% |
| *Clay | 9.5% |
| Gas reagent - SiC | 0.5% |
| Wet grinding of the components | |
| Preparation of press powder in a tower spray drier. | |
| Powder pressing on a hydraulic press. | |
| Drying | 200° C. |
| Heating | 1000–1100° C. |

The resultant material is foamed glass. The density is 120–300 kg/m³. Field of application is - self-bearing, thermal insulation materials.
*The amount of inductile components and clays in the masses can be exchanged from 0 to 100% of the raw material.

Example 2

| | |
|---|---|
| *Nature glass - perlite | 99.5% |
| Gas reagent - SiC | 0.5% |
| Dry milling of the components | |
| Moisturizing | |
| Vibromoulding | 15–25 sec. |
| Drying | in the kiln |
| Heating | 1200–1350° C. |

The resultant material is foamed perlite. The density is 150–600 kg/m³. Field of application is construction, thermal insulation and fireproof material.

Example 3

| | |
|---|---|
| *Montmorillonite-hydro-mica clay | 99.5% |
| Gas reagent - SiC | 0.5% |
| Dissolution of the clay in the propeller mixer | |
| Pumping the water from slurry on a filterpress | |
| Extrusion of ductile mass | |
| Drying | 70–200° C. |
| Heating | 1200–1350° C. |

The resultant material is foamed clay. The density is 100–300 kg/m³. Field of application is—self-bearing, thermal insulation materials.

Example 4

| | |
|---|---|
| *Kaolinite - hydro-mica clay | 99.5% |
| Gas reagent - SiC | 0.5% |
| Dissolution of the clays in the propeller mixer | |
| Pumping the water from slurry on a filterpress | |
| Extrusion of ductile | |
| Drying | 70–200° C. |
| Heating | 1400–1550° C. |

The resultant material is foamed ball-clay. The density is 120–400 kg/m³. Field of application is—construction, self-bearing, refractory and thermal insulation materials.

Example 5

| | |
|---|---|
| *Kaolin | 99.5% |
| Gas reagent | 0.5% |
| Dissolution of the clays in the propeller mixer | |
| Preparation of press powder in a tower spray drier. | |
| Powder pressing on a hydraulic press. | |
| Drying | 200° C. |
| Heating | 1700–1850° C. |

The resultant material is foamed kaolin. The density is 120–400 kg/m³. Field of application is—refractory, thermal insulation, construction and self-bearing material

Example 6

| | |
|---|---|
| *$Al_2O_3$ (crystalline) | 99.5% |
| Gas reagent - SiC | 0.5% |
| Moisturizing | |
| Vibromoulding | |
| Drying in the kiln | |
| Heating | 2050–2200° C. |

The resultant material is foamed corundum. The density is 150–600 kg/m³. Field of application is refractory, fireproof, thermal insulation and construction material.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A method of forming foamed structural articles comprising:
   a) preparing a homogenous mixture of at least one inorganic oxygen-containing, water-insoluble raw material having a particle size <60 microns and at least one gas forming reagent having a particle size <30 microns, wherein the homogeneous mixture is prepared to include 99.0–99.95 wt % raw material and 0.05–1.0 wt % gas forming reagent;
   b) humidifying and shaping the mixture;
   c) heating the shaped mixture to a formation temperature sufficient to melt the raw material to provide an oxygen-containing molten liquid phase;
   d) at the formation temperature, reacting the gas forming reagent with the oxygen-containing molten liquid phase to produce a molten liquid foamed material; and
   e) cooling the resultant foamed material to a solid state.

2. A method of forming foamed structural articles comprising:
   a) preparing a homogenous mixture of at least one inorganic oxygen-containing, water-insoluble raw material having a particle size <60 microns and at least one gas forming reagent having a particle size <30 microns, including selecting the material for the gas forming reagent from at least one nitride;
   b) humidifying and shaping the mixture;
   c) heating the shaped mixture to a formation temperature sufficient to melt the raw material to provide an oxygen-containing molten liquid phase;
   d) at the formation temperature, reacting the gas forming reagent with the oxygen-containing molten liquid phase to produce a molten liquid foamed material; and
   e) cooling the resultant foamed material to a solid state.

* * * * *